Sept. 13, 1960     K. D. CORNELIUS     2,952,191
MULTIPLE CUTTER

Filed Jan. 27, 1959     2 Sheets-Sheet 1

FIG. I

Kent D. Cornelius
INVENTOR.

Sept. 13, 1960     K. D. CORNELIUS     2,952,191
MULTIPLE CUTTER

Filed Jan. 27, 1959     2 Sheets-Sheet 2

Kent D. Cornelius
INVENTOR.

United States Patent Office 2,952,191
Patented Sept. 13, 1960

2,952,191

MULTIPLE CUTTER

Kent D. Cornelius, 604 Barnes St., Albertville, Ala.

Filed Jan. 27, 1959, Ser. No. 789,463

2 Claims. (Cl. 90—38)

(Granted under Title 35, U.S. Code (1952), sec. 266)

The invention described herein may be manufactured and used by or for the Government for governmental purposes without the payment of any royalty thereon.

My invention relates to machine cutting tools and more particularly to such tools having multiple teeth for cutting.

Cataloguing of unidentified metallic stock material requires that uniform small-sized samples of the material be obtained for laboratory identification thereof.

Conventionally, specimens are cut from the material and reduced to samples of uniform chips by a shaper having a tool with a single cutting edge for laboratory analysis of the physical and chemical properties of the material. The shaper includes a carriage disposed to secure a specimen thereto and a head with the cutting tool secured thereto is disposed for linear reciprocal operation in parallel relation with the carriage for cutting engagement of the tool with the specimen. The carriage is reciprocally operable in feed and return strokes normal to the head to secure a series of cuts across the specimen. The carriage is manually operable to advance the specimen towards the head to adjust the depth of the cuts and to secure a succession of the series to provide the chips required for the samples. The time required per sample is substantially one hour, and an operator is required to be in constant attendance on the machine.

An object of my invention is to provide a machine with a tool having multiple cutting teeth.

Another object of my invention is to provide such a tool with teeth disposed in stepped relation with a plane therein.

A further object of by invention is to provide such a tool with the teeth thereof raked for relief of the cutting edges thereof.

Other aims and objects of my invention will appear from the following explanation:

In carrying out my invention a tool for such a machine is provided with a plurality of teeth disposed in stepped relation with a plane therein and respectively provided with pairs of cutting edges disposed for respective parallel and normal relation with the carriage.

The pairs of cutting edges respectively meet in points and the surfaces of the respective teeth are appropriately raked rearwardly from the points for relief of the cutting edges.

For more complete understanding, reference is directed to the following explanation and the accompanying drawing, in which, Figure 1 is a perspective view of one embodiment of my invention;

Figure 1:
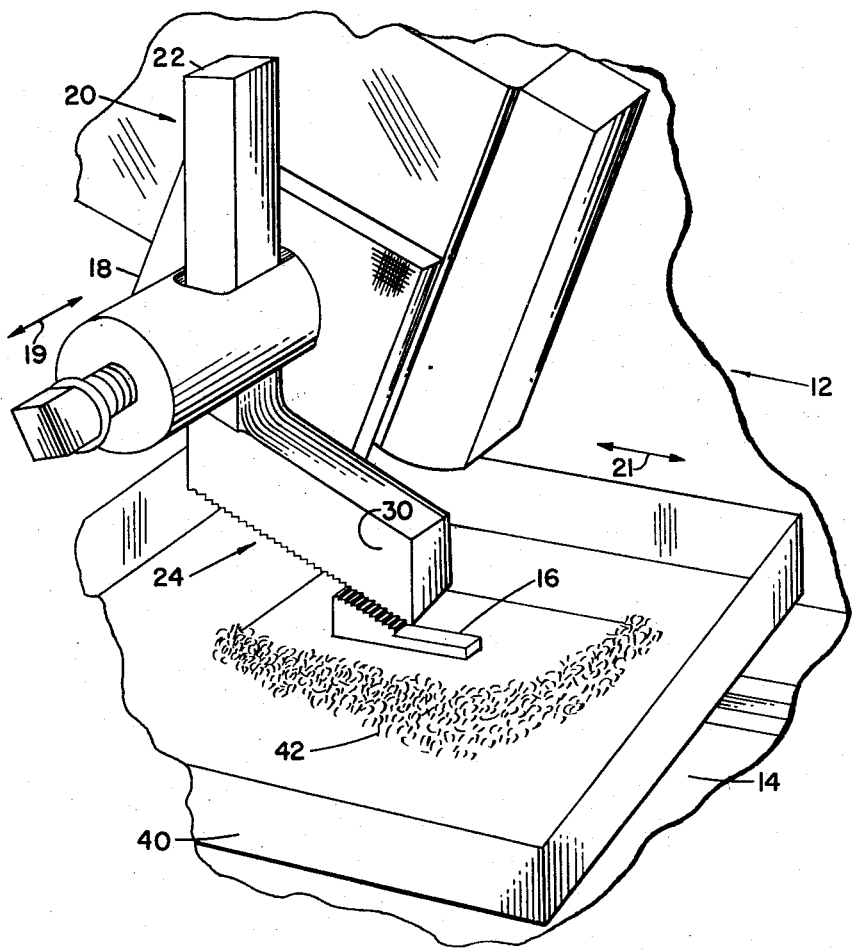
Figure 2:
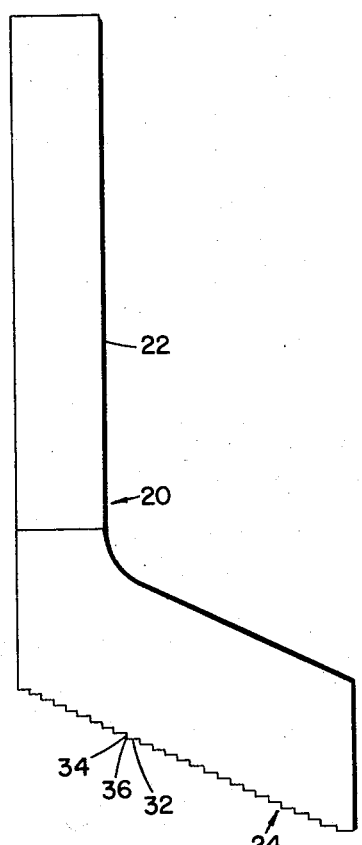
Figure 2 is an elevation of the tool shown in Figure 1.
Figure 3:
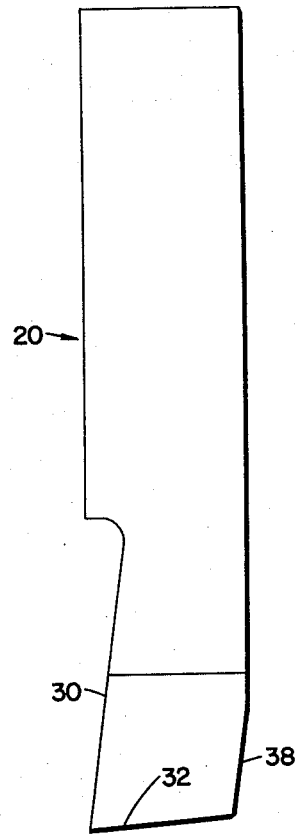
Figure 3 is an end view of the tool shown in Figure 2.
Figure 4:
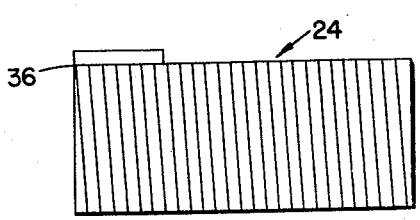
Figure 4 is a bottom view of the tool in Figure 2.
Figure 5:
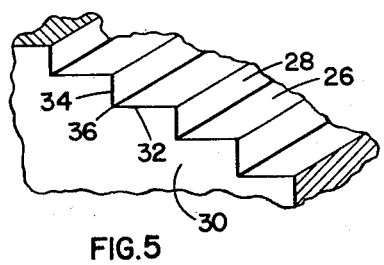
Figure 5 is an enlarged perspective view of the teeth of the tool.

Accordingly, a cutting machine 12 is provided with a carriage 14 having a vise (not shown) for securing a specimen 16 thereto. A head 18 of the machine is provided with a tool 20 having a body 22 secured to head 18. Body 22 includes a plurality of similarly disposed teeth 24 with respective adjacent surfaces 26 and 28 in normal relation to produce chips of uniform size proportionate to the size of the teeth. Surface 30 intersects surfaces 26 and 28 respectively to form cutting edges 32 and 34 intersecting at points 36 to secure the uniform small-sized chips required in the sample.

Tool 20 is disposed for respective parallel and normal relation of edges 32 and 34 with carriage 14, and with surfaces 26, 28 and 30 raked away from points 36 for relief of cutting edges 32 and 34. A bearing surface 38 is disposed in parallel relation with surface 30 for convenient dressing of edges 32 and 34.

In operation of machine 12 to reduce a portion of specimen 16 to a sample of chips 42, tool 20 is adjusted to scan the depth of the portion; head 18 is engaged in a series of ram and reverse strokes along direction 19; and between the respective reverse strokes and succeeding ram strokes, carriage 14 advances specimen 16 towards tool 20 in increments for cutting engagement of the tool with the specimen. The sum of the increments equals the length of the specimen portion for reduction thereof to provide chips 42 for the sample. The respective lengths of edges 32 and 34 determine the size of chips 42.

While the foregoing is a description of the preferred embodiment, the following claims are intended to include those modifications and variations that are within the spirit and scope of my invention.

I claim:

1. A tool for a machine including a carriage for supporting a work specimen, disposed for linear operation in cycles, and a ram head disposed for lineal reciprocations transversely thereto corresponding to each of the cycles, said tool being disposed for attachment to the head and provided with a plurality of contiguous edges alternately disposed for respective parallel and normal relation with the direction of operation of said carriage and cutting engagement with a portion of the specimen, said parallel edges being stepped and said normal edges traversing the depth of the said portion to the specimen for conversion thereof into a sample of chips responsive to one of the cycles.

2. A tool as in claim 1 with said edges respectively provided with lengths for predetermined uniform size of the chips.

References Cited in the file of this patent

UNITED STATES PATENTS

| | | |
|---|---|---|
| 2,067,551 | Sykes | Jan. 12, 1937 |
| 2,424,473 | Luers | July 22, 1947 |
| 2,893,111 | Dedekind | July 7, 1959 |